3,705,891
METHOD FOR PRODUCING UNGELATINIZED STARCH DERIVATIVES
John V. Tuschhoff and Cleo E. Hanson, Decatur, Ill., assignors to A. E. Staley Manufacturing Company, Decatur, Ill.
No Drawing. Continuation-in-part of application Ser. No. 696,110, Jan. 8, 1968. This application Nov. 4, 1970, Ser. No. 86,994
Int. Cl. C08b 19/06
U.S. Cl. 260—233.3 R          4 Claims

ABSTRACT OF THE DISCLOSURE

Ungelatinized cold-water-swelling hydroxypropylated starch materials produced by reacting a dry granular starch material directly with propylene oxide in the presence of a polybasic, water-soluble salt of phosphoric acid. The starch derivatives produced by this method are useful as food additives, for cement binders, and for similar uses in which a cold-water-swelling starch derivative is useful.

BACKGROUND OF THE INVENTION

This application is a continuation-in-part of our application Ser. No. 696,110, filed Jan. 8, 1968 and now abandoned.

This invention is directed to a method for producing ungelatinized starch derivatives suitable for human consumption by reacting propylene oxide directly with dry granular starch in the presence of a catalytic salt such as disodium or trisodium phosphate which does not adversely affect the taste characteristics of the reaction product.

Various forms of hydroxyalkyl ethers of starch have been produced by reacting alkylene oxides with amylaceous materials. For example, hydroxyalkyl starches have been prepared by treating starch with a concentrated aqueous solution of alkali prior to or during the addition of an alkylene oxide. However, the granular structure of the starch is destroyed by the action of the alkali, and special and costly processing equipment is required to obtain a dry powdered starch product.

The granular structure of starch can be retained by treating an aqueous starch slurry with a relatively dilute solution of alkali and then reacting the starch slurry with an alkylene oxide. However, in this reaction, the degree to which the starch is substituted is so low that the application of heat is required to solubilize the starch in water.

A more highly substituted granular starch can be obtained by reacting a dry granular starch with alkylene oxide in the presence of a catalyst such as sodium hydroxide, or a neutral salt such as sodium chloride. Generally, this type of "dry reaction" is conducted in a closed system, under pressure and at elevated temperatures. Although it is possible to obtain a more highly substituted, cold-water-swelling starch by this reaction, a long reaction time is required to obtain a starch sufficiently derivatized to make it cold-water-swelling, and the starch material produced is not palatable, particularly when sodium chloride is used as the catalyst.

Although the reaction time for the above processes can be decreased by conducting the reaction under increased pressure and at higher temperatures, this increases the proportion of side reaction products which tend to give the starch material an oily or greasy appearance, a disagreeable odor, and poor color properties. These side reaction products are generally difficult and costly to remove.

The above prior art methods for producing hydroxyalkyl starches are described in more detail in U.S. Pats. 2,516,632; 2,516,633; 2,516,634; 2,733,238; and 3,014,901. The first three of these patents list identical applicants, and were filed in the same chronological order as the patents are numbered, the latter two both being continuation-in-part applications of the earlier filed application(s). None of the above patents recognize the significance associated with catalyst selection for a dry granular starch reaction. In fact, U.S. Pat. 2,516,634 which was filed four months *subsequent* to 2,516,633 mentions *only* catalytic salts which applicants have discovered tend to cause poor taste in the reaction product, making it unsuitable for human consumption. Although U.S. Pat. 2,516,633 does mention phosphate salt catalysts, this patent is directed to a starch slurry reaction process which does *not* produce a cold-water-soluble starch, but one which must be cooked. No distinction is made by any of these patents, or any of the references known to applicants, between the particular alkylene oxides selected for a dry reaction. Applicants have found that propylene oxide produces far superior resultsw hen used in the combination of the invention.

This invention is directed to an improved method for producing an ungelatinized hydroxpropyl starch, which is cold-water-swelling, and especially well suited for food use. A dry granular starch is reacted with propylene oxide in the presence of a catalytic polybasic, water soluble salt of phosphoric acid to produce a hydroxypropyl starch having improved color and taste.

Polybasic water soluble salts of phosphoric acid which are particularly good catalysts for practicing applicants' invention include the water-soluble secondary and tertiary, metal ortho- and pyro-phosphates, and especially those in which the metal cation is an alkal or alkaline earth metal. Examples of such catalysts include disodium phosphate, trisodium phosphate, dipotassium phosphate, tripotassium phosphate, trimagnesium phosphate, dilithium phosphate, and trilithium phosphate. Sodium chloride, potassium chloride, calcium chloride, sodium sulfate and potassium sulfate are not useful because they tend to impart a bitter taste, or otherwise adversely affect the product of the reaction.

The phosphate catalyst is added to the granular starch by a technique which will assure even or uniform distribution, such as by spraying a concentrated solution of the catalyst on the dry starch or by mixing a dilute solution of the catalyst with the granular starch, and then drying the mixture. The catalyst can also be added as a solid to a starch slurry. After the catalyst has been completely dissolved and is uniformly distributed throughout the slurry, excess water is removed and the granular starch dried prior to contact with the propylene oxide. Other organic solvents, or mixtures of water and organic solvents, such as alcohol in water or acetone in water, can also be used as a carrier for the catalyst, if desired.

The amount of catalyst used in producing the hydroxypropyl starch ether of the invention is preferably between 0.5–1.5% based on the weight of the starch dry substance. However, an amount as low as 0.1% or as high as 5.5% can be used, if desired. The use of catalyst in amounts of below 0.1% or above 5.5% is generally unsatisfactory because, at catalyst levels below 0.1%, the reaction is sluggish, while at catalyst concentrations above 5.5%, some discoloration of the final starch product is encountered. The use of excessive catalyst is also to be avoided to obtain products of low ash and low Gardner color value when desired. The amount of catalyst present is measured after excess water has been removed.

After the mixing step described above, the starch-catalyst mixture is dried to a moisture level of less than 15% based on the weight of the starch, and preferably to a moisture level of between about 8–13%. The moisture level of the starch should be maintained above 5% to maintain a practical reaction rate, and under 15% to avoid moisture condensation on the reactor walls, which tends to agglomerate the solubilized starch material and cause lumping of the final starch product. For purposes of this invention, the term "dry granular starch" shall mean a starch having less than 15% moisture based on the weight of the starch. After the drying step, propylene oxide is added directly to the dry granular starch. The propylene oxide can be added either batchwise or in metered amounts. Best results are obtained by controlled, incremental addition of the propylene oxide to the dry granular starch while it is being agitated to insure thorough mixing.

The amount of propylene oxide added can be varied over a wide range, depending on the degree of substitution desired. Amounts as low as 1% to as high as 300%, based on the weight of the starch material d.s.b., can be added. For most starches, and particularly for those of the dent corn variety, the propylene oxide is generally added in an amount of between 20–25%. With these amounts, the hydroxypropylated starch product is cold-water-swelling, and is more easily dispersible in water. Unmodified potato starch for example, generally requires between about 30–35% propylene oxide to give the starch material cold-water-swelling properties, and to make the starch product more easily dispersible in water.

The reaction conditions required for dry reacting starch with propylene oxide in the presence of a water-soluble phosphate catalyst can be varied over a relatively broad range. However, for maximum reaction efficiency, certain reaction conditions should be maintained within the preferred ranges described below.

The reaction temperature should be maintained in a range from about 140° and 190° F. Below 140° F., the reaction is too slow, while above 190° F., the reaction product tends to discolor. The reaction pressure should be at least 20 p.s.i.g., and pressures as high as 200 p.s.i.g. or higher can be used in some cases. Pressures of between 35 and 75 p.s.i.g. are preferred, particularly when the temperature of reaction is between 170–190° F.

The starch materials which can be hydroxypropylated using the process and catalyst of this invention may be any modified or unmodified root or cereal type starch, so long as it still contains reactive hydroxyl groups. For example, starches derived from corn, wheat, tapioca, sago, rice, sorghum, waxy maize, high amylose corn, can be used. The starch fractions amylose and amylopectin, as well as modified starches such as acid-thinned, oxidized, dextrinized, acid-thinned hydroxyethylated starches, cationic starches, cross-linked starches, such as epichlorohydrin cross-linked starches, can also be used.

The hydroxypropylated cross-linked starches, referred to above, are particularly valuable in food applications, or for uses in which a cold-water-swelling starch material or a certain stability in viscosity is required. In addition, these hydroxypropylated cross-linked starches exhibit excellent freeze-thaw, clarity, and rheological properties. The starches produced by this invention can also be used as thickeners for agricultural sprays, even when the water used for the spray mixtures comes from very cold streams and lakes. The derivatized starches of this invention can also be used as sizing and coating agents in the paper and textile industry. The ease with which the starches can be reconstituted in cold as well as in warm water is particularly important for applications in which a viscosity pattern similar to that of freshly cooked starch is desired.

The ungelatinized starch product of this invention is cold-water-swelling, and, under a polarizing microscope, the granules exhibit a dark-cross pattern of a spherocrystal, which is referred to as "birefringence." When water is added to this ungelatinized, cold-water-swelling starch material, the crosses observed in the starch granules gradually become less distinct and finally disappear altogether. This phenomena also occurs when a non-cold-water-swelling starch suspension is heated to its gelatinization temperature. The swollen starch is easily dispersed in water and the translucency of the dispersion improves. A starch swollen and dispersed in water is frequently referred to as being "in solution."

Although our hydroxypropylation reaction described above can be catalyzed by the use of a polybasic water soluble salt of phosphoric acid, a more uniformly substituted hydroxypropylated starch product can be obtained if the reaction is conducted in the presence of a flow agent such as tricalcium phosphate. This particular combination gives a product having more uniform cold-water-swelling characteristics. This is believed to be due to more uniform substitution of propyl groups throughout the starch granules.

The flow agent also provides a product which exhibits improved free-flowing and fluidized characteristics. There is minimal caking of the starch product on the walls of the reactor or on the blades of the agitator during the reaction. Although tricalcium phosphate is preferred, other materials such as magnesium oxide or magnesium carbonate can be used as flow agents. Sufficient flow agent should be used to maintain the starch in a substantially fluidized condition during the reaction. Excellent results have been obtained when the flow agent is used in amounts of between 0.05 to 3.5% dry substance basis, of the total reaction mixture, and preferably in amounts of between 0.1 and 1.5%. The flow agent is generally added to the starch material prior to the addition of propylene oxide, but it may be added to the final reaction product if only the free flowing or fluidized characteristics are desired.

The following examples are intended to more particularly illustrate various modes of carrying out the invention.

EXAMPLE 1

To a 21° Bé. starch slurry, solid disodium phosphate catalyst was added in an amount sufficient to provide a catalyst concentration of 1–1.5% based on the weight of the dry starch. The catalyst starch slurry was then filtered and the starch cake dried to a moisture level of between 8–11%. The catalyst-treated starch was then placed in a one quart beverage bottle, and propylene oxide added in an amount of 25% based on the weight of the starch d.s.b. The bottle was capped and placed in a hot water bath maintained at a temperature of 165–180° F. for a period of 8–9 hours. The product was analyzed and was found to be 11–15% hydroxypropylated and substantially completely (100%) cold-water-swelling.

The above example was repeated with the exception that the disodium phosphate was replaced with sodium sulfate. It was found that to obtain a product having cold-water-swelling properties comparable to that obtained with the disodium phosphate catalyst, it was necessary to carry out the reaction under essentially the same reaction conditions for a period of 16–18 hours, about twice that required when using the disodium phosphate catalyst.

EXAMPLES 2–10

Example 1 was repeated with the exception that an acrolein-crosslinked starch having an alkali fluidity of 49 cc. (0.25 N NaOH), was used to demonstrate the catalytic effect that various polybasic water soluble metal salts of phosphoric acid had on the preparation of hydroxypropyl ethers of crosslinked starches. The reaction was conducted at a temperature of about 180° F. for periods of from 4 to 24 hours. A Brookfield viscosity for each of the products was determined, as reported in Table I below. The Brookfield viscosity reflects the degree of substitution of the hydroxypropyl starch.

TABLE I

[Analytical data on dry reacted hydroxypropyl starches—catalyst comparison]

| | | | | Brookfield viscosity data | | |
|---|---|---|---|---|---|---|
| Example | Catalyst | Reaction time (hours) | Starch slurry concentration, percent | Reading (cps.) 5 min. | Flavor and color properties | |
| 2 | NaCl | 4 | 10 | 135 | Unsatisfactory. | |
| 3 | Na₂HPO₄ | 4 | 10 | 2,760 | Satisfactory. | |
| 4 | Na₂SO₄ | 4 | 10 | 7 | Unsatisfactory. | |
| 5 | NaCl | 8 | 5 | 9,800 | Do. | |
| 6 | Na₂HPO₄ | 8 | 5 | 10,000 | Satisfactory. | |
| 7 | Na₂SO₄ | 8 | 5 | 3,700 | Unsatisfactory. | |
| 8 | NaCl | 15 | 5 | 8,280 | Do. | |
| 9 | Na₂HPO₄ | 15 | 5 | 8,280 | Satisfactory. | |
| 10 | Na₂SO₄ | 15 | 5 | 8,260 | Unsatisfactory. | |

The catalytic advantage of disodium phosphate over sodium chloride and disodium sulfate is clearly shown in the above table. For reaction times of four hours, this catalytic advantage is most vividly shown. For reaction times of eight hours, the catalytic advantage was still evident over disodium sulfate and was about the same for sodium chloride; however, the product obtained with the sodium chloride catalyst was generally unsatisfactory for food use. After 15 hours, the degree of substitution on the starch material was essentially the same for all three catalysts, however, the flavor and color properties of products obtained with non-phosphate catalysts were generally unsatisfactory as a food additive.

The Brookfield viscosities were determined on starch slurry concentrations of 5 and 10% with a Brookfield Viscometer Model RVT. The mixture was stirred and the viscosity was measured at 20 r.p.m. For viscosities of less than 5,000 cps., a #3 Spindle was used. For viscosities of below 10,000 cps. a #4 Spindle was used while for viscosities above 10,000 cps., a #5 Spindle was used.

EXAMPLES 11–17

With the exception of using different phosphate salts as reported in Table II below, the procedure of Example 1 was followed in preparing the hydroxypropyl starch ethers. Except for Example 17 where 3.0 gms. of catalyst per 100 gms. of starch were used, 1–1.5 gms. of catalyst per 100 gms. of starch were used in each example.

TABLE II

| Example | Phosphate salt | Reaction time, hours | Cold-water swellability, percent |
|---|---|---|---|
| 11 | NaH₂PO₄ | 8 | <10 |
| 12 | Na₂HPO₄ | 8 | 90–99 |
| 13 | Na₃PO₄ | 8 | 90–99 |
| 14 | K₂HPO₄ | 8 | 90–99 |
| 15 | Li₂HPO₄ | 8 | 90–99 |
| 16 | Ca₃PO₄ | 24 | <10 |
| 17 | (NH₄)₂HPO₄ | 24 | <10 |

These examples show that for producing cold-water-swelling hydroxypropyl starches, the preferred catalyst is a polybasic water soluble metal salt of phosphoric acid.

EXAMPLE 18

Example 1 was repeated with the exception that the disodium phosphate catalyst was replaced with tricalcium phosphate. The reaction was conducted at a temperature of about 180° F. for a period of 16 hours. The product was evaluated and was found to be less than 10% cold-water-swelling. This partially cold-water-swelling hydroxypropyl starch was returned to the reaction chamber and reacted for an additional period of 24 hours. The reaction product was evaluated and was found to be still only partially cold water swelling. However, when the above experiment was repeated with a catalytic mixture containing both disodium phosphate and tricalcium phosphate it was found that the product was 100% cold water swelling, and was free of lumping. In addition, there was evidence that when the catalyst contained small amounts of a flow agent such as tricalcium phosphate a more uniformly substituted product was obtained.

EXAMPLE 19

This example shows that the process of this invention can be used for producing granular hydroxypropyl starches on a semi-commercial basis.

A 1,000-gallon granular corn starch slurry was prepared by adding 3,500–4,000 pounds of granular corn starch to 720 gallons of water. To the starch slurry three pounds of anhydrous disodium phosphate per 100 pounds of starch dry substance basis was added. The phosphate catalyst and granular corn starch were mixed for 15 minutes with a high-speed, six-blade turbine mixer (120 revolutions/minute) at a temperature of 90–110° F. The catalyst-starch mixture was shakered through a Roball 10XX silk screen, filtered and then dried without washing at a temperature of 225–250° F. to a starch moisture content of 8–11%. Tricalcium phosphate was mixed with the catalyst starch mixture in an amount of one half pound per 100 pounds of starch d.s.b.

Six hundred pounds of the above catalyst-starch mixture were added to a reaction vessel which was evacuated to a 25-inch vacuum. To remove air, the vessel was flushed by adding 50 p.s.i.g. of nitrogen and then venting to the atmosphere. The reaction vessel containing the starch mixture was then heated to 175° F. and evacuated to a vacuum of 25 inches (2 p.s.i. absolute). Propylene oxide was added over a period of two hours to a pressure of 35 p.s.i.g. As the reaction progressed, propylene oxide was continuously added to maintain a pressure of 35 p.s.i.g. The reaction was conducted for a period of about seven hours at a temperature of 175° F.±5° F. After the reaction had run for about six hours, samples of the reacted starch were removed from the reaction vessel every half hour, and the viscosity of the reacted starch determined on a Brookfield Viscometer Model RVF. The viscosity was determined by taking 20 grams of the reacted starch and adding thereto 380 mls. of tap water having a temperature of about 75° F. The reacted starch was stirred for about 10 minutes before the viscosity was taken using a No. 3 Spindle at 20 r.p.m. When a viscosity of between about 3,000–4,000 cps. was obtained (generally in 6 to 8 hours), the reaction was stopped by venting the propylene oxide from the reaction vessel. The reaction vessel was pressurized with nitrogen, evacuated, and repressurized with nitrogen, and once again evacuated before the reaction vessel was opened and the starch removed therefrom. The reaction product was screened through a U.S. #60 screen and reground to the desired particle size. On analysis, it was found that substantially all of the hydroxypropyl starch material thereby produced was cold-water-swelling.

When the above process was repeated with a disodium sulfate catalyst rather than the disodium phosphate catalyst, the reaction time required to obtain a completely cold-water-swelling product was approximately 12–16 hours.

It was further found that when the above reaction was conducted in the absence of tricalcium phosphate, the product did not appear to be as uniformly substituted or possessed the free flowing, fluidized characteristics which were obtained when the tricalcium phosphate was present.

SUMMARY

Applicants have observed that other reagents, such as ethylene oxide do not produce a usable product using the process of applicants' invention. When attempts were made to produce a smooth, ungelatinized hydroxyethylated starch using the method of the invention, the reaction proceeded erratically, and the product produced contained numerous "fish eyes" or glassy lumps of overreacted starch material. Such a product is unsuitable for food uses, and the yield is uneconomical.

The dry-reacted hydroxypropylated starch ether of the invention has proved to have satisfactory taste. It is ungelatinized, cold-water-swelling, and therefore, most suitable for use in food products and other applications in which cold-water-swelling is a useful and important characteristic. The success of the reaction process of the invention in consistently producing a good tasting and smooth flowing, cold-water-swelling product economically is due to the complete process combination, including the use of the particular catalyst, a polybasic water-soluble metal salt of phosphoric acid. It has not been appreciated until now that a dry reaction of starch with propylene oxide in the presence of an alkali metal or alkaline earth metal salt of phosphoric acid in the manner described could produce a good tasting starch ether derivative which is ungelatinized, cold-water-swelling, and most suitable for use in food products.

The following claims more particularly point out and distinctly claim the subject matter which applicants regard as their invention.

What is claimed is:

1. A process for producing a cold-water-swelling ungelatinized hydroxypropylated starch ether comprising reacting a dry granular starch material containing about 5 to 15 percent water based on the weight of the starch at a temperature in the range of 140 to 190° F. with propylene oxide under dry conditions and in the presence of from 0.1 to 5.5%, based on the weight of the starch, of a polybasic water-soluble metal salt of phosphoric acid, said salt being selected from the group consisting of disodium phosphate, trisodium phosphate, dipotassium phosphate, tripotassium phosphate, trimagnesium phosphate, dilithium phosphate, and trilithium phosphate, said reaction being conducted in a closed container, and in the presence of fluidizing quantities of a water insoluble flow agent selected from the group consisting of tricalcium phosphate, magnesium oxide and magnesium carbonate.

2. A process for producing a cold-water-swelling ungelatinized hydroxypropylated starch ether comprising reacting a dry granular starch material containing about 5 to 15 percent water based on the weight of the starch at a temperature in the range of 140 to 190° F. with propylene oxide under dry conditions and in the presence from 0.1 to 5.5%, based on the weight of the starch, of a polybasic water-soluble metal salt of phosphoric acid, the metal of said salt being selected from the group consisting of the alkali metals and the alkaline earth metals, wherein the starch is reacted in the presence of fluidizing quantities of a water insoluble flow agent selected from the group consisting of tricalcium phosphate, magnesium oxide and magnesium carbonate, said reaction being conducted in a closed container under a pressure of at least 20 p.s.i.g.

3. The process of claim 2, wherein the flow agent is tricalcium phosphate.

4. A process for producing hydroxypropylated starches comprising treating a granular starch material with a catalytic quantity of a solution of a polybasic water-soluble metal salt of phosphoric acid, the metal of said salt being selected from the group consisting of the alkali and the alkaline earth metals, drying said starch to a moisture content of less than 15% by weight of starch, and reacting said dried starch at a temperature in the range of 140 to 190° F. with a quantity of propylene oxide in an amount sufficient to provide a completely cold-water-swelling starch derivative, said reaction being conducted in a closed container under a pressure of at least about 20 p.s.i.g., and said reaction being carried out in the presence of a flow agent selected from the group consisting of tricalcium phosphate, magnesium oxide, and magnesium carbonate.

References Cited

UNITED STATES PATENTS

| | | | |
|---|---|---|---|
| 2,516,633 | 7/1950 | Kesler et al. | 260—233.3 |
| 2,516,634 | 7/1950 | Kesler et al. | 260—209 |

DONALD E. CZAJA, Primary Examiner

M. I. MARQUIS, Assistant Examiner

U.S. Cl. X.R.

260—233.5